US 8,831,017 B2

(12) United States Patent
Nukaya

(10) Patent No.: US 8,831,017 B2
(45) Date of Patent: Sep. 9, 2014

(54) DATA OUTPUT ADJUSTMENT APPARATUS, DATA OUTPUT ADJUSTMENT METHOD, RGMII NETWORK SYSTEM AND RGMII NETWORK COMMUNICATION PATH CHANGE METHOD

(75) Inventor: Kensuke Nukaya, Shizuoka (JP)

(73) Assignee: NEC Access Technica, Ltd., Shizuoka (JP)

( * ) Notice: Subject to any disclaimer, the term of this patent is extended or adjusted under 35 U.S.C. 154(b) by 75 days.

(21) Appl. No.: 13/486,919

(22) Filed: Jun. 1, 2012

(65) Prior Publication Data

US 2012/0307835 A1 Dec. 6, 2012

(30) Foreign Application Priority Data

Jun. 2, 2011 (JP) ................................ 2011-124400

(51) Int. Cl.
*H04L 29/10* (2006.01)
*H04L 12/56* (2006.01)

(52) U.S. Cl.
CPC .................................. *H04L 49/351* (2013.01)
USPC ...................................................... 370/401

(58) Field of Classification Search
CPC ..... H04L 29/0627; H04L 29/06; H04L 45/00; H04L 12/66
USPC .......................................... 370/401, 419, 252
See application file for complete search history.

(56) References Cited

U.S. PATENT DOCUMENTS

| | | | | |
|---|---|---|---|---|
| 6,127,970 | A * | 10/2000 | Lin ........................... | 342/357.31 |
| 6,374,288 | B1 * | 4/2002 | Bhagavath et al. ........... | 709/203 |
| 6,778,480 | B2 * | 8/2004 | Nadershashi et al. ...... | 369/53.15 |
| 7,373,520 | B1 * | 5/2008 | Borthakur et al. ............ | 713/189 |
| 7,500,051 | B2 * | 3/2009 | Recio et al. .................... | 711/113 |
| 7,991,937 | B1 * | 8/2011 | Yin et al. ....................... | 710/305 |
| 8,488,467 | B2 * | 7/2013 | Shore et al. .................... | 370/235 |
| 2003/0231660 | A1 * | 12/2003 | Vinnakota et al. ............. | 370/474 |
| 2004/0179478 | A1 * | 9/2004 | Ke et al. ......................... | 370/242 |
| 2007/0204317 | A1 * | 8/2007 | Geile et al. .................... | 725/106 |
| 2010/0017523 | A1 * | 1/2010 | Yoshiuchi ...................... | 709/228 |
| 2011/0228685 | A1 * | 9/2011 | Higashi et al. ................ | 370/252 |
| 2012/0134372 | A1 * | 5/2012 | Huang et al. .................. | 370/463 |
| 2014/0010230 | A1 * | 1/2014 | Shore et al. .................... | 370/352 |

FOREIGN PATENT DOCUMENTS

JP 2009-188479 A 8/2009

OTHER PUBLICATIONS

IEEE Std 802.3-2008.*

* cited by examiner

*Primary Examiner* — Mark Rinehart
*Assistant Examiner* — Peter Solinsky
(74) *Attorney, Agent, or Firm* — Sughrue Mion, PLLC

(57) ABSTRACT

A data output adjustment apparatus which adjusts an output timing when an outputting data with different transmission speed includes an input part which is provided corresponding to an external device connected with the data output adjustment apparatus, and gets data from the external device, a buffer part which is provided corresponding to the input part, and buffers the data got by the input part, and, an outputting part which instructs the output timing of the data corresponding to the transmission speed to the buffer part, and receives and outputs the data that the buffer part outputted corresponding to the instruction.

7 Claims, 9 Drawing Sheets

DATA OUTPUT ADJUSTMENT APPARATUS, DATA OUTPUT ADJUSTMENT METHOD, RGMII NETWORK SYSTEM AND RGMII NETWORK COMMUNICATION PATH CHANGE METHOD

This application is based upon and claims the benefit of priority from Japanese Patent Application No. 2011-124400, filed on Jun. 2, 2011, the disclosure of which is incorporated herein in its entirety by reference.

TECHNICAL FIELD

This invention relates to a data output adjustment apparatus, a data output adjustment method, a RGMII network system and a RGMII network communication path change method.

BACKGROUND ART

In recent years, electric devices, such as a computer and a printer, are connected and used with a network in many cases. In this case, a plurality of standards of the cable which connects the electric device and the network exist. On the other hand, the electric device which performs high-speed communication with the maximum clock frequency of 125 MHz is proposed. Therefore, when the transmission speed of the electric device and the cable standard are not in agreement, a timing adjustment of output data is needed. Corresponding to an input/output of DDR (Double Data Rate), the clock frequency needs to be changed to the frequency of 125 MHz, 25 MHz, or 2.5 MHz based on the standard of Gigabit Ethernet.

In relation to the timing adjustment technology of such output data, the transmitting control circuit with FIFO (First-In First-Out) buffer which buffers IP (Internet Protocol) packet is disclosed in Japanese Patent application Laid-Open No. 2009-188479. Then, the packet data generated by CPU (Central Processing Unit) is saved in the FIFO buffer synchronizing with a clock signal more nearly high-speed than standard clock signal RCK (for example, 125 MHz) corresponding to the transmission speed of the communications network. Moreover, the packet data saved in the FIFO buffer is read synchronizing with the standard clock signal RCK.

However, in Japanese Patent application Laid-Open No. 2009-188479, in order to perform a data processing efficiently, the output speed adjustment of the data outputted from the CPU is performed, but an input speed adjustment of the data inputted into the CPU is not performed. This reason is for improving the data processing efficiency, assuming that the transmission speed in the network is fixed speed. Therefore, since the timing adjustment of the output data cannot be performed when the transmission speed is not fixed speed, there is a possibility that the correct communication cannot be performed.

SUMMARY

The main objects of this invention are to provide a data output adjustment apparatus which can perform an output adjustment in order that data can be correctly transmitted and received with different transmission speed, a data output adjustment method, a RGMII network system, and a RGMII network communication path change method.

A data output adjustment apparatus which adjusts an output timing when an outputting data with different transmission speed includes an input part which is provided corresponding to an external device connected with the data output adjustment apparatus, and gets data from the external device, a buffer part which is provided corresponding to the input part, and buffers the data got by the input part, and, an outputting part which instructs the output timing of the data corresponding to the transmission speed to the buffer part, and receives and outputs the data that the buffer part outputted corresponding to the instruction.

A data output adjustment method for adjusting an output timing when an outputting data with different transmission speed includes an input procedure for getting data, a buffer procedure for performing the buffer of the got data, a timing instruction procedure for instructing the output timing of the data corresponding to the transmission speed, and an output procedure for receiving the data outputted corresponding to the timing instruction procedure.

A RGMII network system which performs RGMII network communication includes a first external device which performs predetermined processing, a second external device which includes the Ethernet physics layer connected to the RGMII network, a third external device which operates when the first external device shifts to an energy-saving state, and a path switching part which includes the switch to set up a communication path with the external device by the first external device, a data output adjustment apparatus provided corresponding to the second external device and the data output adjustment apparatus.

A RGMII network communication path change method for changing a communication path when communicating by a RGMII network includes a procedure for detecting transmission speed, an input procedure for inputting data, a buffer procedure for performing the buffer of the inputted data, a timing directions procedure for directing output timing of the data outputted according to the transmission speed, and an output procedure for outputting the data outputted according to the timing directions procedure.

BRIEF DESCRIPTION OF THE DRAWINGS

Exemplary features and advantages of the present invention will become apparent from the following detailed description when taken with the accompanying drawings in which.

EXEMPLARY EMBODIMENT

A First Exemplary Embodiment

Figure 1:
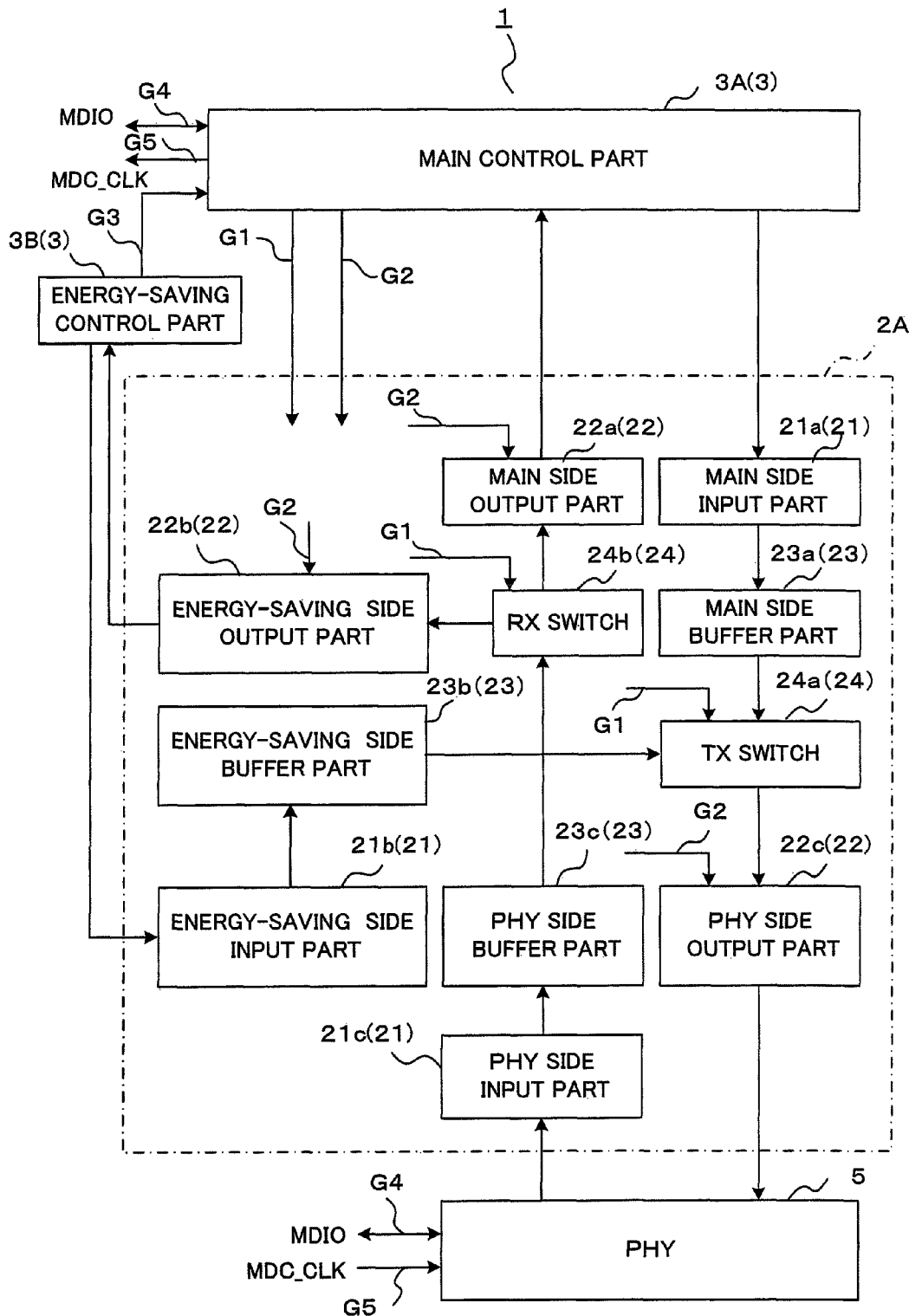
FIG. 1 is a block diagram of a RGMII network system provided with a data output adjustment apparatus according to a first exemplary embodiment of the present invention.

The first exemplary embodiment of the invention will be explained. FIG. 1 is a block diagram of a RGMII network system 1 provided with a data output adjustment apparatus 2A according to the first exemplary embodiment of the invention.

The data output adjustment device 2A of the RGMII network system 1 is connected with electric devices 3, such as a personal computer and a printer, and is connected with the Ethernet physics chip (PHY) 5 by a RGMII interface. The electric device 3 and the PHY 5 is an external device by which external connection is carried out to the data output adjustment apparatus 2A.

The electric device 3 includes a main control part (control part) 3A and an energy-saving control part (control part) 3B. And the electric device 3 is in the state in a normal mode or energy-saving mode. The normal mode is in the state where the main control part 3A operates and all functions can operate. The energy-saving mode is in the state where the energy-saving control part 3B operates and a predetermined function can operate. The main control part 3A and the energy-saving control part 3B stop or operate corresponding to whether power is supplied or not. When the power supply is stopped to the main control part 3A, in order to prevent loss of setting information memorized in the main control part 3A, the setting information shunts and/or continuous operation only of a memory means to memorize the setting information is performed.

In this exemplary embodiment, the data output adjustment apparatus 2A, the main control part 3A, the energy saving controller 3B and the PHY 5 are formed in respectively different semiconductor chip.

When the predetermined energy-saving mode shift conditions are fulfilled (for example, in cases where a communication is not performed among predetermined time), the electric device 3 shifts to the energy-saving mode from the normal mode. On the other hand, when the main control part 3A is in the energy-saving mode (for example, in cases where the main control part 3A receives a communication request) and a return conditions are fulfilled, a power control signal G3 outputs to the main control part 3A from the energy saving controller 3B. The main control part 3A which received the power control signal G3 returns to the normal mode from the energy-saving mode.

When shifting to the energy-saving mode or when returning to the normal mode, the main control part 3A outputs the switch change signal G1 to the data output adjustment device 2A. As follows, the data output adjustment apparatus 2A which received the switch change signal G1 performs a communication path change.

The return conditions are fulfilled when an essential processing (for example, a print processing in case an electric device is a printer) which the main control part 3A must start is required. Therefore, the request which can be processed only by the energy saving controller 3B such as an ARP (Address Resolution Protocol) packet does not need to fulfill the return conditions.

Moreover, the main control part 3A receives a MDIO (Management Data Input/Output) signal G4 from the PHY 5 synchronizing with a clock signal (MDC_CLK) G5. Then, the main control part 3A gets the information regarding to the transmission speed. The main control part 3A outputs a speed selection signal G2 to the data output adjustment apparatus 2A based on the got transmission speed. The data output adjustment apparatus 2A performs timing adjustment of the output data based on the speed selection signal G2 so that it may describe later.

When the main control part 3A shifts the mode of the energy-saving mode or the normal mode, the data output adjustment apparatus 2A performs the communication path change. The data output adjustment apparatus 2A includes an input part 21, an output part 22, a buffer part 23 and a path change part 24.

The input part 21 includes a main side input part 21a which data from the main control part 3A inputs, an energy-saving side input part 21b which data from the energy-saving control part 3B inputs and a PHY side input part 21c which data from PHY 5 inputs.

The output part 22 includes a main side output part 22a which outputs the data to the main control part 3A, an energy-saving side output part 22b which outputs the data to the energy-saving control part 3B and a PHY side output part 22c which outputs the data to the PHY 5.

The buffer part 23 includes a main side buffer part 23a, an energy-saving side buffer part 23b and a PHY side buffer part 23c. The main side buffer part 23a buffers the data from the main side input part 21a, and outputs the buffered the data to the PHY side output part 22c. The energy-saving side buffer part 23b buffers the data from the energy-saving side input part 21b, and outputs the buffered the data to the PHY side output part 22c. The PHY side buffer part 23c buffers the data from the PHY side input part 21c, and outputs the buffered the data to the main side output part 22a or the energy-saving side output part 22b.

The path change part 24 includes a main side buffer part 23a, a TX switch 24a, a main side output part 22a, an energy-saving side output part 22b, and a RX switch 24b. The TX switch 24a is connected with the main side buffer part 23a, the energy-saving side buffer part 23b and the PHY side output part 22c. The RX switch 24b is connected with the main side output part 22a, the energy-saving side output part 22b and the PHY side buffer part 23c.

Then, in the case of the normal mode, the TX switch 24a changes the communication path, in order that the data from the main side buffer part 23a may output to the PHY side outputting part 22c (TX communication). Moreover, the RX switch 24b changes the communication path, in order that the data from the PHY side buffer part 23c may be outputted to the main side outputting part 22a (RX communication).

On the other hand, in the case of the energy-saving mode, the TX switch 24a changes the communication path, in order that the data from the energy-saving side buffer part 23b may be outputted to the PHY side outputting part 22c (TX communication). Moreover, the RX switch 24b changes the communication path, in order that the data from the PHY side buffer part 23c may be outputted to the energy-saving side outputting part 22b (RX communication).

Accordingly, in the TX communication of the normal mode, the data from the main control part 3A is outputted to PHY 5 via the main side input part 21a, the main side buffer part 23a, the TX switch 24a and the PHY side output part 22c. Moreover, in the RX communication of the normal mode, the data from PHY 5 is outputted to the main control part 3A via the PHY side input part 21c, the PHY side buffer part 23c, the RX switch 24b and the main side output part 22a synchronizing with operation of the TX switch 24a.

On the other hand, in the TX communication of the energy-saving mode, the data from the energy-saving control part 3B is outputted to the PHY 5 via the energy-saving side input part 21b, the energy-saving side buffer part 23b, the TX switch 24a and the PHY side output part 22c. Moreover, in the RX communication of the energy-saving mode, the data from the PHY 5 is outputted to the energy-saving control part 3B via the PHY side input part 21c, the PHY side buffer part 23c, the RX switch 24b and the energy-saving side output part 22b synchronizing with operation of the TX switch 24a.

A device with buffer functions, such as FIFO, is used for the main side buffer part 23a, the energy-saving side buffer part 23b and the PHY side buffer part 23c. Moreover, in the main side input part 21a, the main side output part 22a, the energy-saving side input part 21b, the energy-saving side output part 22b, the PHY side input part 21c and the PHY side output part 22c, a DDR method which performs the data transfer synchronizing with a rising edge and a falling edge of a clock signal is used.

Figure 2:
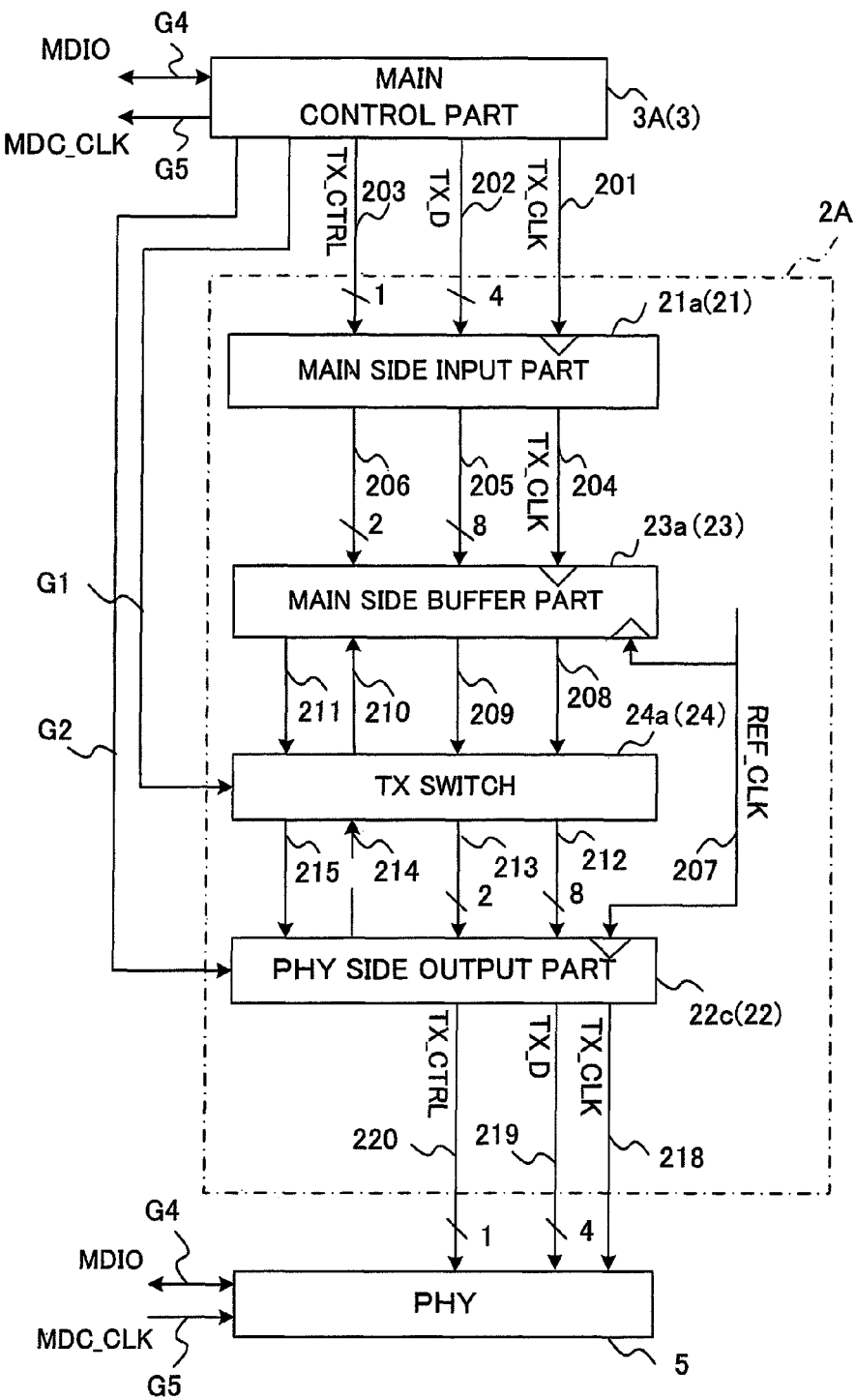
FIG. 2 is a block diagram for explaining a TX communication in a normal mode according to the first exemplary embodiment.

Next, the normal mode is explained. In this case, the TX switch 24a and the RX switch 24b are forming the communication path of the main control part 3A and PHY 5 based on the switch change signal G1. FIG. 2 is a block diagram for explaining the TX communication in the normal mode.

The main control part 3A outputs the TX clock signal (TX_CLK) 201, the TX data (TX_D) 202 and the TX control signal (TX_CTRL) 203 to the main side input part 21a. TX clock signal 201 is the clock signal outputted to the data output adjustment apparatus 2A, and is set as the frequency of 125 MHz, 25 MHz, or 2.5 MHz corresponding to the transmission speed of the Ethernet. The frequency is not limited to the above-mentioned frequency. The TX data 202 is the data signal, and the TX control signal 203 is the control signal to the data output adjustment apparatus 2A.

The bus width of the TX data 202 is 4 bits, and the bus width of the TX control signal 203 is 1 bit. The form of the TX data 202 is based on the standard of the Ethernet.

Moreover, the TX data 202 and the TX control signal 203 are outputted synchronizing with both the rising edge and falling edge of the TX clock signal 201. Therefore, by the standard of the RGMII, even in cases where the transmission speed is with 10BASE-T and 100BASE-TX, the TX data 202 of the rising edge and the falling edge of the TX clock signal 201 turns into the same the data.

The main side input part 21a transforms the TX data 202 received from the main control part 3A into the communication data 205 with twice bus width which synchronized with rising of the TX clock signal 204 synchronizing with the edge of rising and falling of the TX clock signal 201. Thereby, the TX data 202 of the bus width of 4 bit is transformed into the communication data 205 of the bus width of 8 bit, and the TX control signal 203 of the bus width of 1 bit is transformed into the communication control signal 206 of the bus width of 2 bit.

The main side buffer part 23a buffers the communication data 205 and the communication control signal 206. Then, the buffered communication data 208 is outputted synchronizing with a reference clock signal (REF_CLK) 207 of 125 MHz.

In addition, the output of the communication data 208 is not necessarily outputted for every pulse of the reference clock signal 207. That is, although the communication data 208 synchronizes with the reference clock signal 207, depending on the input/output control signal 210 set up based on the transmission speed, it may not be outputted with the frequency of 125 MHz.

Although this output timing is described later, since the main side buffer part 23a synchronizes with the reference clock signal 207 and the input/output control signal 210 controls output timing, either whose frequency based on the standard of Giga-Ether is 125 MHz, 25 MHz or 2.5 MHz can perform appropriate output.

Moreover, the main side buffer part 23a outputs the input/output state signal 211 to the PHY side output part 22c through the TX switch 24a. This input/output state signal 211 is a signal which notifies the buffer state of the communication data 208 in the main side buffer part 23a. That is, the input/output condition signal 211 indicates whether the buffer of the communication data 208 which can be outputted is performed.

The TX switch 24a performs the communication path change in the normal mode and the energy-saving mode depending on the switch change signal G1. In cases where the communication path change is performed at the normal mode, the communication path is set up between the main side buffer part 23a and the PHY side outputting part 22c. Since the TX switch 24a only changes the communication path, the communication data 208 and the communication data 212, the communication control signal 209 and the communication control signal 213, the input/output control signal 210 and the input/output control signal 214, and the input/output state signal 211 and the input/output state signal 215 have the respectively same signal.

The PHY side output part 22c transforms the communication data 212 and the communication control signal 213 into the TX data 219 and the TX control signal 220 so that the standard of the RGMII interface may be suited. This transformation is performed synchronizing with the rising edge of the reference clock signal 207. Then, the TX data 219 and the TX control signal 220 synchronize with the rising edge and the falling edge of the TX clock signal 218. Thereby, the communication data 212 of 8 bit is transformed into the TX data 219 of 4 bit, and the communication control signal 213 of 2 bit is transformed into the TX control signal 220 of 1 bit. Therefore, since the speed to which the data is outputted from the PHY side output part 22c is slower than the speed buffered by the main side buffer part 23a, the data are receivable from the main side buffer part 23a corresponding to the data output timing of the PHY side output part 22c.

Moreover, the speed selection signal G2 is inputted into the PHY side output part 22c from the main control part 3A. The PHY side outputting part 22c judges whether the speed selection signal G2 corresponds to which the transmission speeds of the 1000 BASE-T, the 100 BASE-TX or the 10 BASE-T. And the PHY side output part 22c outputs the input/output control signal 214 and the TX clock signal 218 based on this judgment result. For example, in cases where it is judged as the transmission speed of the 100 BASE-TX, in order that the transmission speed may increase 1/5 times, the input/output control signal 214 with which one clock corresponds to five clocks of the reference clock signal 207, whose frequency is 125 MHz, is outputted. Moreover, the TX clock signal 218 of 25(=125/5) MHz is outputted.

Then, synchronizing with the TX clock signal 218, the communication data 219 is outputted from the PHY side output part 22c. On the other hand, the input/output control signal 214 is inputted into the main side buffer part 23a as an input/output control signal 210 via the TX switch 24a. The main side buffer part 23a outputs the communication data 208 buffered synchronizing with this input/output control signal 210.

The TX communication of the main control part 3A and PHY 5 is similarly performed irrespective of the existence of the data output adjustment apparatus 2A. Moreover, since the main side buffer part 23a buffers the data at high speed from the PHY side output part 22c, it can be immediately responded to the data request from the PHY side output part 22c. Therefore, the output timing of the data can be adjusted.

Figure 3:
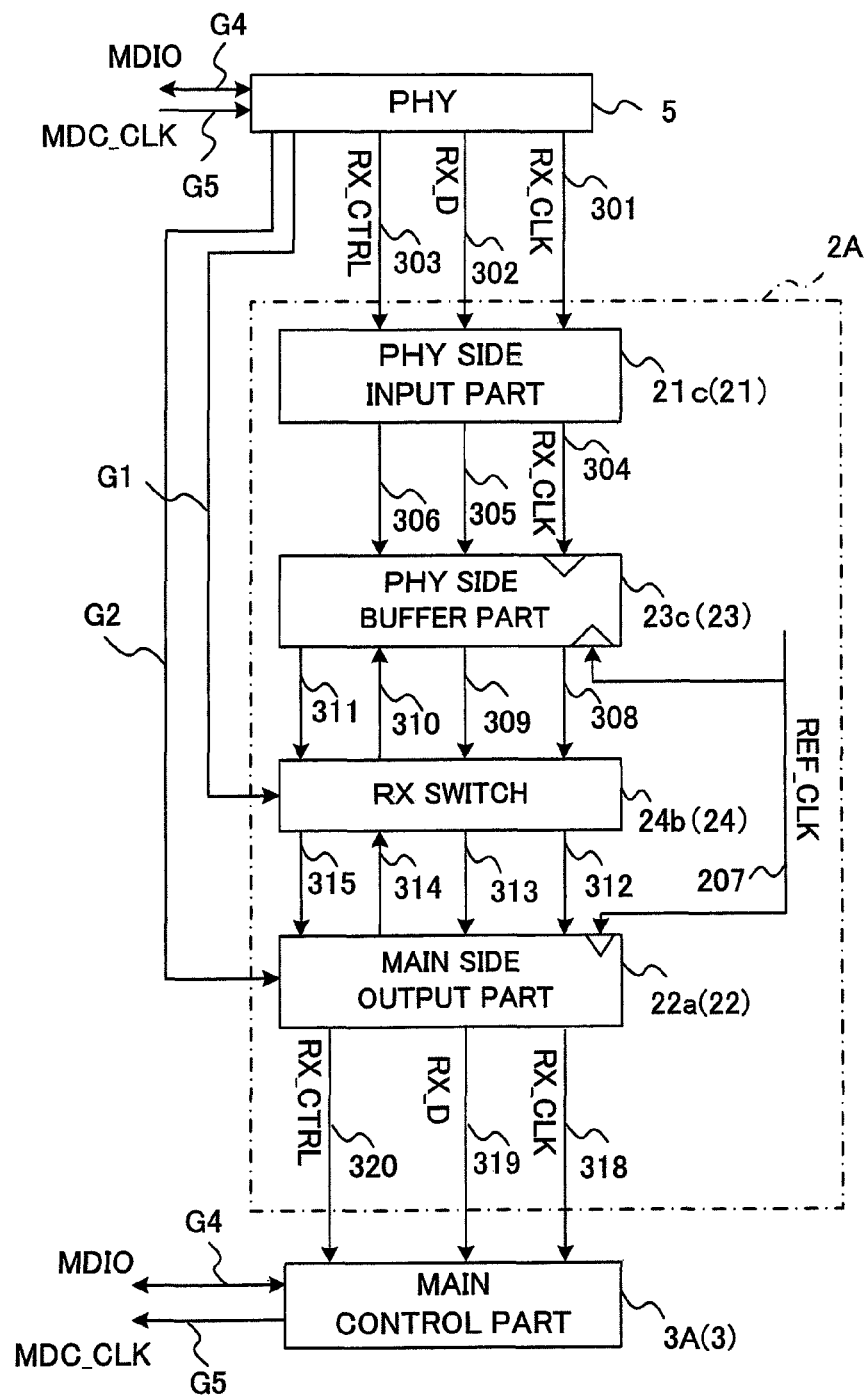
FIG. 3 is a block diagram for explaining a RX communication in the normal mode according to the first exemplary embodiment.

The RX communication via the RX switch 24b of the normal mode as well as the TX communication mentioned above is performed out. FIG. 3 is a block diagram for explaining the RX communication of the normal mode. The main side input part 21a and the PHY side input part 21c, the main side buffer part 23a and the PHY side buffer part 23c, the TX switch 24a and the RX switch 24b, and the main side output part 22a and the PHY side output part 22c function similarly, respectively, and these signals are transmitted to the main control part 3A from the PHY 5.

Thereby, the data communications of the RX communication with the PHY 5 and the main control part 3A are similarly performed irrespective of existence of the data output adjustment apparatus 2A.

Figure 4:
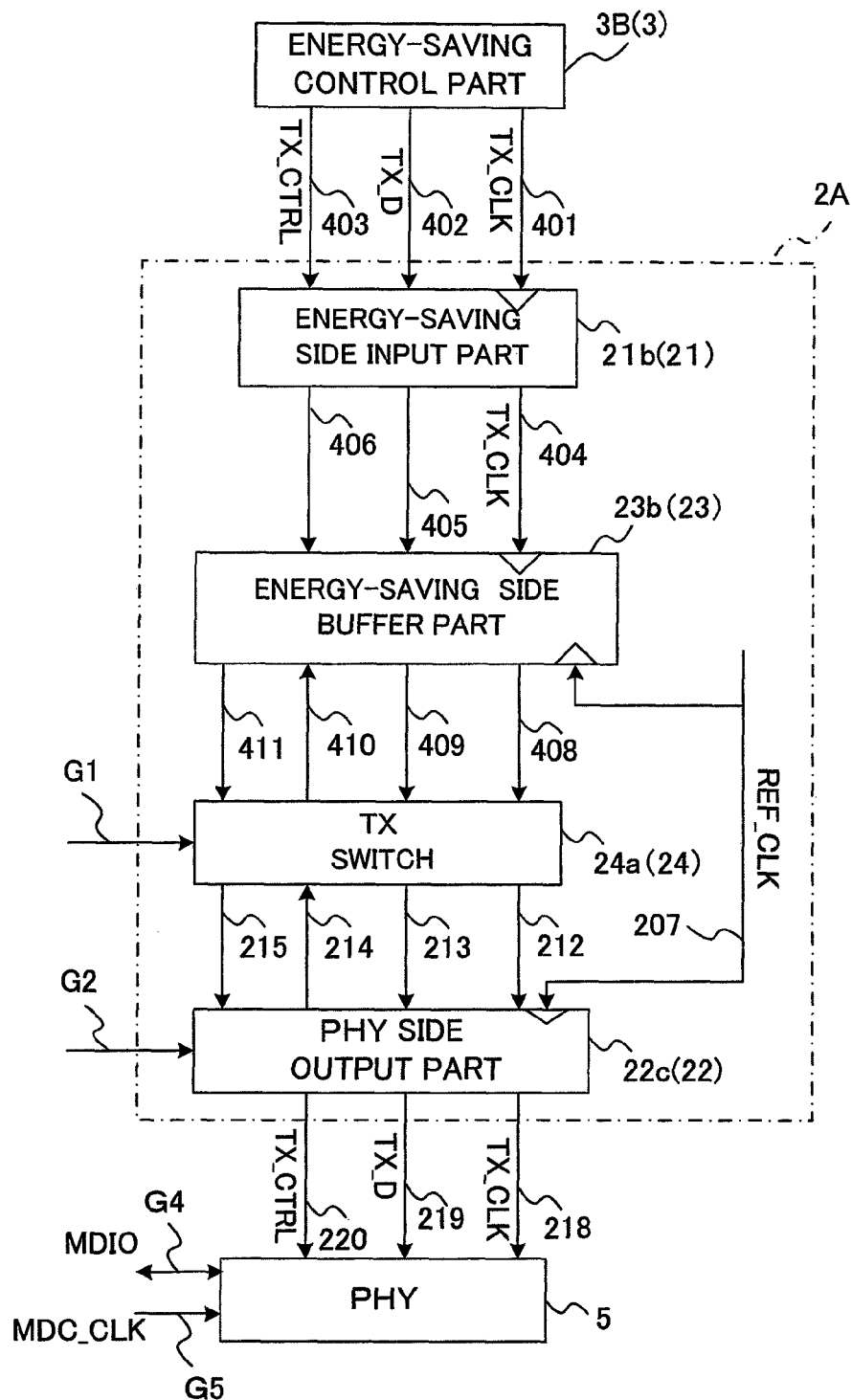
FIG. 4 is a block diagram for explaining the TX communication in an energy-saving mode according to the first exemplary embodiment.
Figure 5:
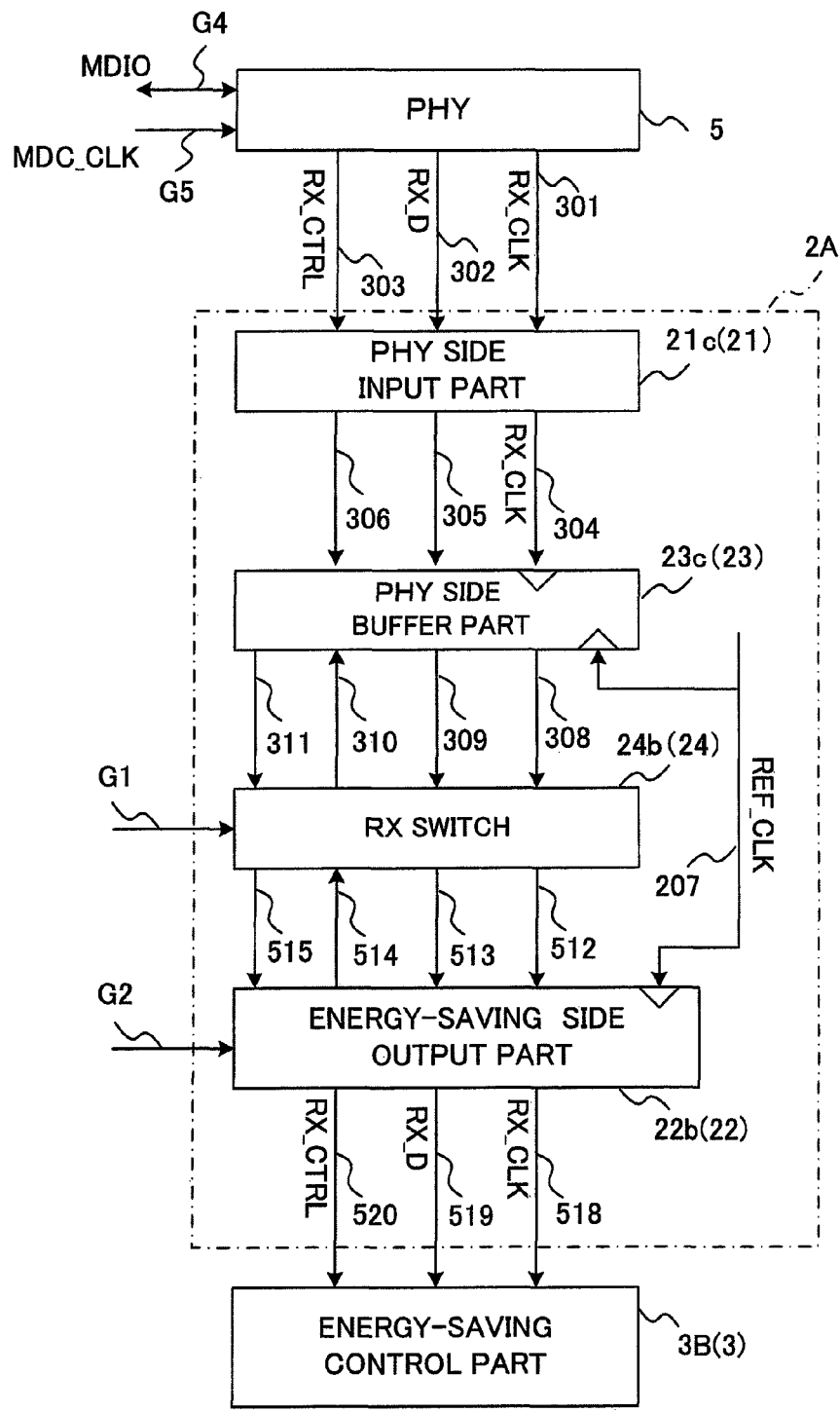
FIG. 5 is a block diagram for explaining the RX communication in the energy-saving mode according to the first exemplary embodiment.

FIG. 4 is a block diagram for explaining the TX communication of energy-saving mode. Moreover, FIG. 5 is a block diagram for explaining the RX communication of the energy-saving mode. As shown in these figures, directions of the flow of each signal differ, but the communication functions are the same as the TX communication of the normal mode. Therefore, the duplication explanation is omitted.

Figure 6:
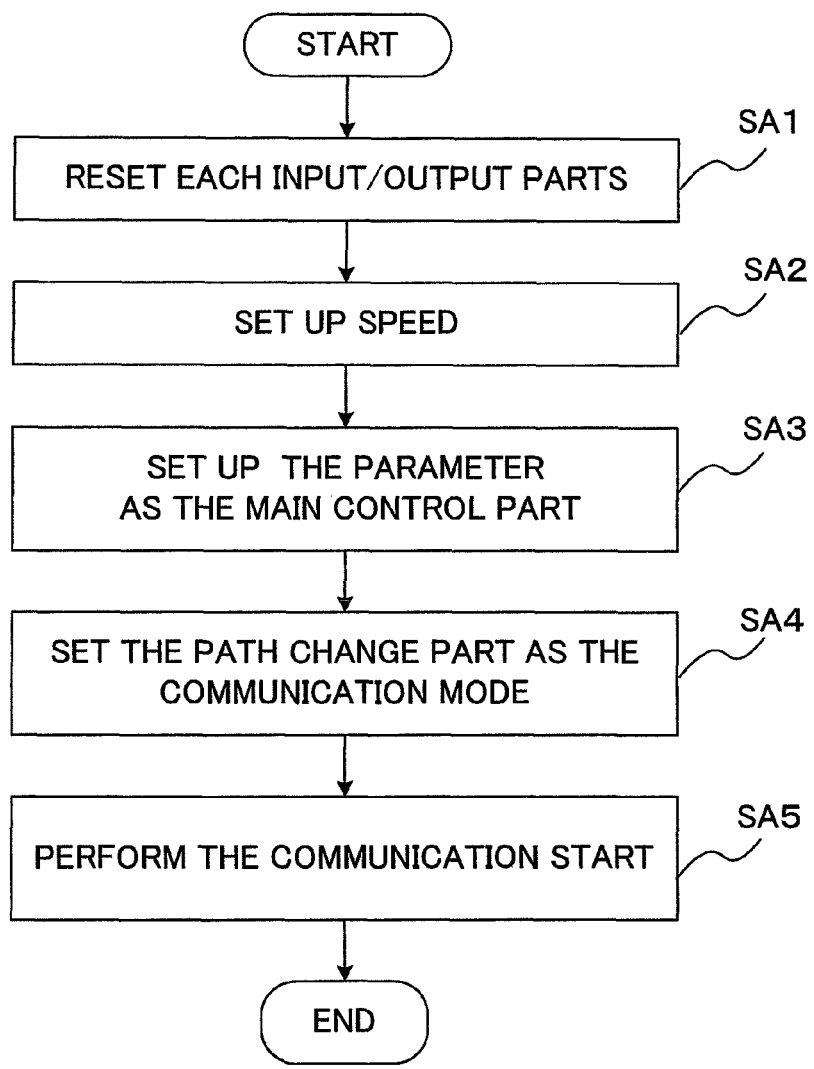
FIG. 6 is a sequence for setting as the normal mode according to the first exemplary embodiment.

Next, the setting sequence of the normal mode is explained with reference to FIG. 6.

Step SA1: The main control part 3A resets the input/output parts, such as the main side input part 21a, the energy-saving side output part 22b, etc. of the data output adjustment apparatus 2A.

Step SA2: Then, the main control part 3A gets the transmission speed by receiving the MDIO signal G4 from PHY 5. The speed selection signal G2 is outputted to the main side output part 22a, the energy-saving side output part 22b and the PHY side output part 22c based on this transmission speed. Each output parts, such as the main side output part 22a, performs speed setting so that the data output timing may be suitable for transmission speed based on this speed selection signal G2.

Step SA3: The main control part 3A also performs a self-setup of the parameters, such as the IP address required for network communication.

Step SA4: The main control part 3A is set as the state which can communicate and the switch change signal G1 is outputted to the data output adjustment apparatus 2A by the above processing. The TX switch 24a and the RX switch 24b of the data output adjustment apparatus 2A changes the communication path to the normal mode based on the switch change signal G1. Thereby, the main control part 3A and the PHY 5 can communicate now at the set-up speed.

Figure 7:
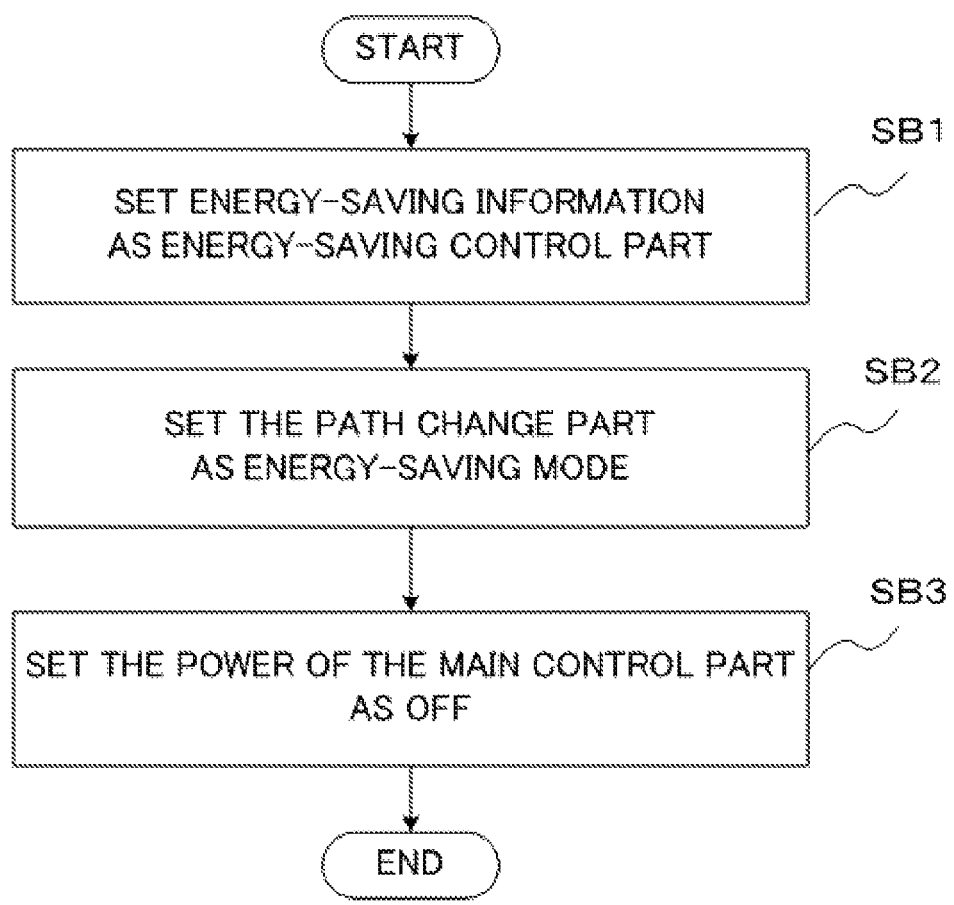
FIG. 7 is a sequence for shifting to the energy-saving mode from the normal mode according to the first exemplary embodiment.

Next, the shift sequence from the normal mode to the energy-saving mode is explained with reference to FIG. 7.

Step SB1: In cases where the predetermined energy-saving shift conditions are fulfilled, the energy-saving information is set in the energy-saving control part 3B. The example of this energy-saving information is the information, such as IP address, which can answer without starting the main control part 3A to the request which received via the network in the energy-saving state. Therefore, since the return to the normal mode is not performed in such a case, effective energy saving is achieved.

Step SB2: Next, the main control part 3A outputs the switch change signal G1 to the data output adjustment apparatus 2A. The TX switch 24a and the RX switch 24b of the data output adjustment apparatus 2A perform the communication path change to the normal mode based on the switch change signal G1. Thereby, the energy-saving control part 3B and the PHY 5 can communicate at the set-up speed.

Step SB3: Since the preparation which shifts to the energy-saving mode is completed above, the energy-saving control part 3B outputs the power control signal G3 which turns OFF the power of the main control part 3A. Thereby, power supply for the main control part 3A stops.

Figure 8:
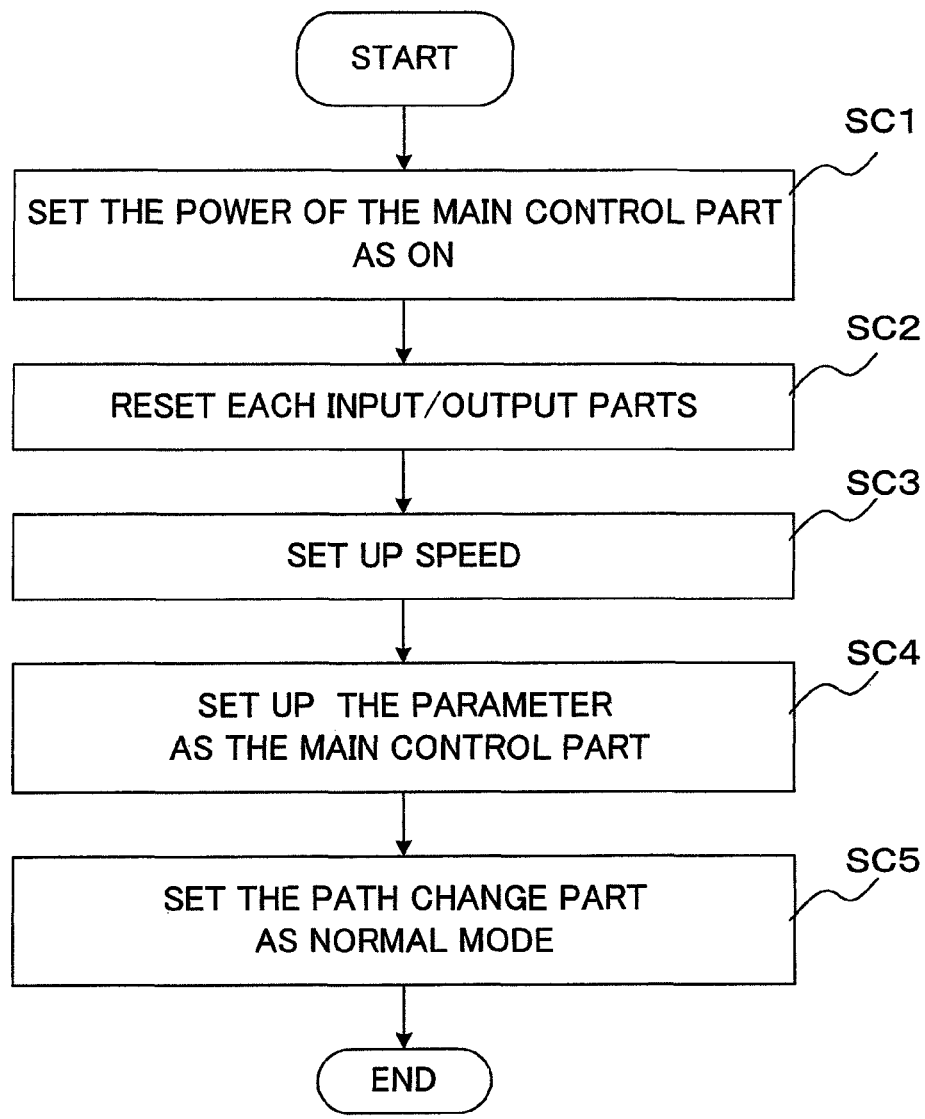
FIG. 8 is a sequence for returning to the normal mode from the energy-saving mode according to the first exemplary embodiment.

Next, the return sequence from the energy-saving mode to the normal mode is explained with reference to FIG. 8.

Step SC1: In the energy-saving mode state, in cases where the energy saving controller 3B judges that the main control part 3A needs to be started by the network communication, the power control signal G3 which starts the power supply of the main control part 3A is outputted. Thereby, the main control part 3A starts.

Steps SC2-SC4: Then, the main control part 3A instructs reset of each input/output part to the data output adjustment apparatus 2A. Moreover, the main control part 3A reads the transmission speed from the PHY 5, and outputs the speed selection signal G2. The each input/output part of the data output adjustment apparatus 2A performs speed setting based on the speed selection signal G2. Moreover, setting information, including the IP address etc., is set in the main control part 3A.

Step SC5: Next, the main control part 3A outputs the switch change signal G1 to the data output adjustment apparatus 2A. The TX switch 24a and the RX switch 24b of the data output adjustment apparatus 2A perform the communication path change to the normal mode based on the switch change signal G1. By this, it returns to the normal mode.

As explained above, since the network change is performed by the path change part 24, the communication which performed the output adjustment of the data to a plurality of transmission speed is achieved. Moreover, even in cases where the communication is performed with a plurality of transmission speed, the energy-saving mode becomes possible.

A Second Exemplary Embodiment

Next, the second exemplary embodiment of this invention is explained. In addition, regarding the same element as the element in first exemplary embodiment, explanation is suitably omitted by using the same symbol.

In first exemplary embodiment, the main control part 3A, the energy-saving control part 3B, the PHY 5 and the data output adjustment apparatus 2A are formed with the respectively independent chip. On the other hand, in this exemplary embodiment, both the energy-saving control part 3B and the data output adjustment apparatus 2A are formed on one chip. Hereafter, the energy-saving control part and the data output adjustment apparatus are described a network response circuit generically.

Figure 9:
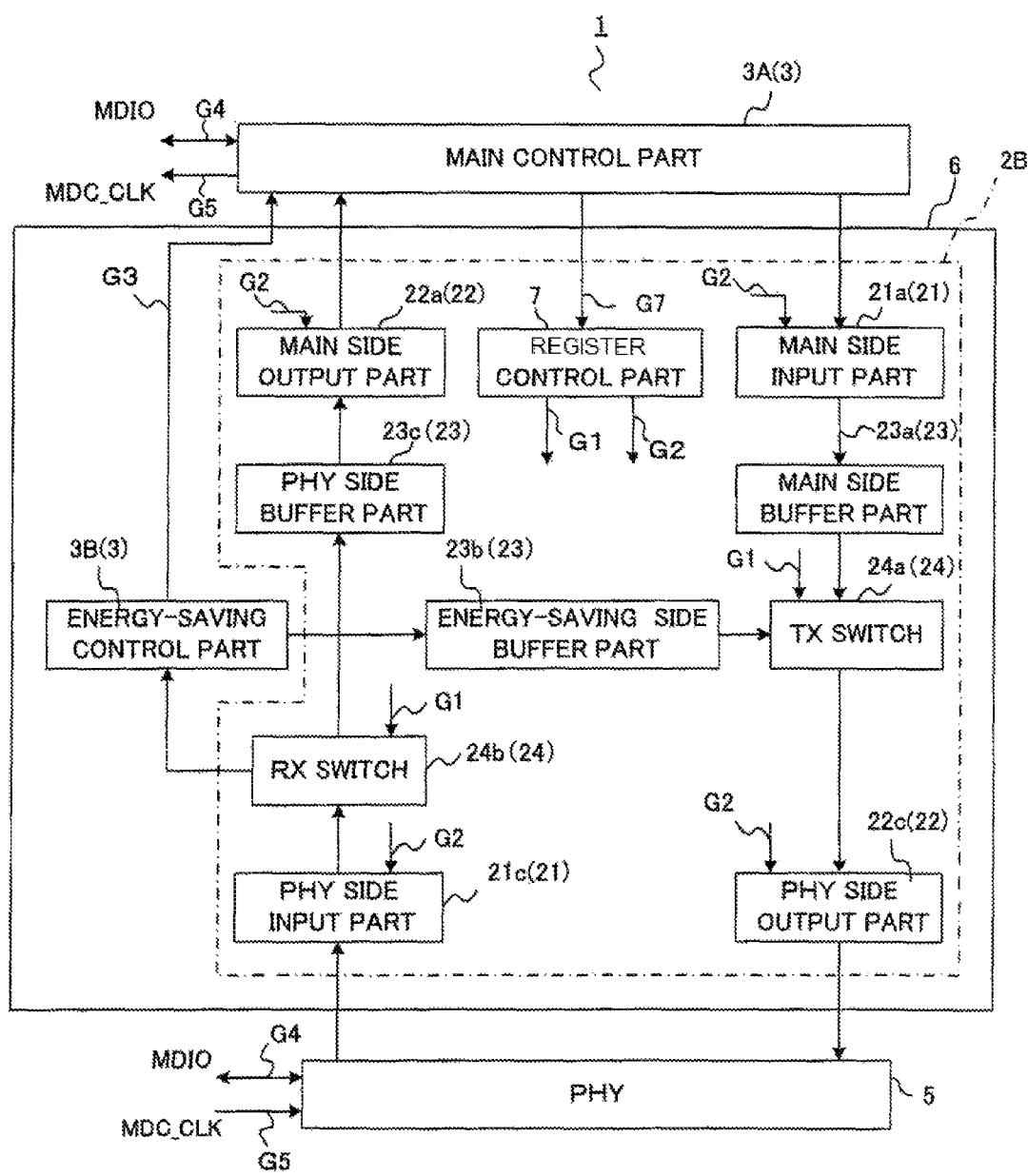
FIG. 9 is a block diagram of a RGMII network system provided with a network response circuit according to a second exemplary embodiment of the present invention.

FIG. 9 is a block diagram of the RGMII network system provided with the network response circuit 6 according to the second exemplary embodiment. The network response circuit 6 is one chip including the energy saving controller 3B and the data output adjustment apparatus 2B. In such structure, since a connection between the energy-saving control part 3B and the data output adjustment apparatus 2B can carry out using the internal wiring of the chip, the interface among these is not required. Therefore, the energy-saving side input part 21b and the energy-saving side output part 22b in the energy-saving control part 3B explained in first exemplary embodiment are omissible.

Moreover, the register control part 7 is provided in this network response circuit 6, the signal from the main control part 3A is memorized, and the speed selection signal G2 and the switch change signal G1 are outputted according to the memorized information. Therefore, even if the main control part 3A is in the state of the energy-saving mode or the normal mode, the mode change in the data output adjustment apparatus 2B is achieved. This means that the shift operation is stopped immediately, if the main control part 3A outputs a instruction signal G7 which is an origin of the speed selection signal G2 and the switch change signal G1 during the shift to the energy-saving mode in register control part 7. Therefore, the shift processing to the energy-saving mode can be performed efficiently.

In addition, the CPU which performs program manipulation, and the network response circuit which receives the predetermined network packet, and answers and returns are applicable to the energy-saving control part 3B.

Moreover, the interface of a MII (Media Independent Interface) etc. can be substituted for the energy-saving control part 3B by limiting to 10BASE-T/100BASE-TX. In this case, the data inputted into the energy-saving control part 3B or the network response circuit 6 does not need to be unified into the frequency of 125 MHz by passing the PHY side buffer part 23c.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A data output adjustment apparatus which is configured in a normal mode and an energy-saving mode, to operate with an external device having a main control part, an energy-saving control part, and an Ethernet physics chip, the apparatus comprising:
   an input part which includes a main side input part configured to communicate with the main control part, an energy-saving side input part configured to communicate with the energy-saving side control part, and a PHY side input part configured to communicate with the Ethernet physics chip, and which gets data from the external device;
   a buffer part which includes a main side buffer part configured to communicate with the main side input part, an energy-saving side buffer part configured to communicate with the energy-saving side input part, and a PHY side buffer part configured to communicate with the PHY side input part, and which buffers the data obtained by the input part;
   an outputting part including a main side output part configured to communicate with the main control part, an energy-saving side output part configured to communicate with the energy-saving control part, and a PHY side output part configured to communicate with the Ethernet physics chip; and
   a path change part including a TX-switch and a RX-switch; wherein:
      in the normal mode:
         the main control part controls the TX-switch to enable a communication path from the main side input part to the PHY side output part via the main side buffer part; and
         the main control part controls the RX-switch to enable a communication path from the PHY side input part to the main side output part via the PHY side buffer part; and
      in the energy-saving mode:
         the main control part controls the TX-switch to enable a communication path from the energy-saving side input part to the PHY side output part via the energy-saving side buffer part; and
         the main control part controls the RX-switch to enable a communication path from the PHY side input part to the energy-saving side output part via the PHY side buffer part; and
      the outputting part controls the timing of the outputting of the data, stored in the buffer part, based on a control signal received from the main control part, corresponding to the transmission speed of the Ethernet physics chip.

2. The data output adjustment apparatus according to claim 1, wherein
   the input part performs a bit transformation which increases the number of bits of the inputted data; and
   the outputting part performs a bit transformation which decreases the number of bits of the data from the buffer part.

3. A reduced gigabit media independent interface (RGMII) network system, which is configured in a normal mode and an energy-saving mode, and performs RGMII network communication, the system comprising:
   a first external device which performs predetermined processing;
   a second external device including an Ethernet physics layer connected to the RGMII network;
   a third external device which operates when the first external device shifts to an energy-saving state; and
   a path switching part including a TX-switch and a RX-switch to set up a communication path via the first external device;
   a data output adjustment apparatus which controls a timing of the outputting of a set of data, wherein:
      in the normal mode:
         the TX-switch enables a communication path from the first external device to the second external device via the data output adjustment apparatus; and
         the RX-switch enables a communication path from the second external device to the first external device via the data output adjustment apparatus; and
      in the energy-saving mode:
         the TX-switch enables a communication path from the third external device to the second external device via the data output adjustment apparatus; and
         the RX-switch enables a communication path from the second external device to the third external device via the data output adjustment apparatus.

4. The RGMII network system according to claim 3, wherein
   the predetermined processing in the first external device, further comprising:

a processing for outputting the speed selection signal which indicates the transmission speed of the RGMII network to the outputting part of the data output adjustment apparatus; and a processing for instructing the path switching part a switch change signal which set up the communication path.

5. The RGMII network system according to claim 4, wherein the outputting part instructs a buffer part of the data output adjustment apparatus concerned the output timing of the data based on the speed selection signal.

6. The RGMII network system according to claim 5, wherein the path switching part changes the communication path based on the switch change signal.

7. The RGMII network system according to claim 3, wherein the data output adjustment apparatus is provided corresponding to the third external device.

* * * * *